(12) United States Patent
Luo et al.

(10) Patent No.: US 11,048,353 B1
(45) Date of Patent: Jun. 29, 2021

(54) FOLDABLE TOUCH DISPLAY DEVICE

(71) Applicant: TPK Advanced Solutions inc., Fujian (CN)

(72) Inventors: Jianxing Luo, Jianyang (CN); Jianbin Yan, Putian (CN); Zhangzheng Yang, Sanming (CN)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 16/987,451

(22) Filed: Aug. 7, 2020

(30) Foreign Application Priority Data

May 22, 2020 (CN) .......................... 202010442825.4

(51) Int. Cl.
  *G06F 3/041* (2006.01)
  *G09F 9/30* (2006.01)

(52) U.S. Cl.
  CPC ............ *G06F 3/0412* (2013.01); *G09F 9/301* (2013.01)

(58) Field of Classification Search
  CPC .......... G06F 3/041; G06F 3/0412; G09F 9/30; G09F 9/301
  See application file for complete search history.

(56) References Cited

U.S. PATENT DOCUMENTS

| 10,642,313 B1 | 5/2020 | Wu et al. |
| 2013/0082984 A1 | 4/2013 | Drzaic et al. |
| 2014/0104762 A1* | 4/2014 | Park ................... H05K 5/0017 361/679.01 |
| 2015/0382446 A1* | 12/2015 | Kwon ................ H01L 27/3276 174/251 |
| 2016/0202831 A1* | 7/2016 | Kim ..................... G06F 3/0443 345/173 |
| 2018/0039352 A1* | 2/2018 | Wu ..................... H01L 51/0097 |
| 2019/0064995 A1 | 2/2019 | Ahn |
| 2019/0339741 A1 | 11/2019 | Park |

FOREIGN PATENT DOCUMENTS

| CN | 209103266 U | 7/2019 |
| CN | 107025014 B | 2/2020 |
| TW | 201735347 A | 10/2017 |

* cited by examiner

*Primary Examiner* — Joe H Cheng
(74) *Attorney, Agent, or Firm* — Cooper Legal Group, LLC

(57) ABSTRACT

A foldable touch display device is provided, including a display module, a touch sensing film, a plurality of transmission lines, and a first adhesive layer. The display module has an upper surface, a side surface, and a lower surface. The touch sensing film is disposed under the display module and extends and bends along the side surface to the upper surface. The touch sensing film includes a plurality of electrode lines disposed on one side of the touch sensing film. The transmission lines cover the electrode lines located at the upper surface of the display module. The first adhesive layer is disposed on the side of the touch sensing film adjacent to the display module. The foldable touch display device can reduce the radius of curvature in the bending area and reduce the thickness of the foldable touch display device.

10 Claims, 9 Drawing Sheets

FOLDABLE TOUCH DISPLAY DEVICE

CROSS-REFERENCE TO RELATED APPLICATION

This application claims priority to China Application Serial Number 202010442825.4, filed on May 22, 2020, which is herein incorporated by reference in its entirety.

BACKGROUND

Field of Disclosure

The present disclosure relates to a foldable touch display device. More particularly, the present disclosure relates to a foldable touch display device having a narrow bezel.

Description of Related Art

In the current folded-back design, the flexible circuit boards bend in the bending zone due to the flexibility of the flexible circuit boards. However, too many flexible circuit board wires in the bending area increases the overall thickness. Therefore, the existing technology needs to be improved to make the touch display device lighter, thinner, and the radius of curvature of the bending area smaller.

SUMMARY

The present disclosure provides a foldable touch display device in which the radius of curvature of the bending area is decreased by extending the electrode lines.

The present disclosure provides a foldable touch display device, comprising a display module, a touch sensing film, a plurality of transmission lines, and a first adhesive layer. The display module comprises an upper surface, a side surface, and a lower surface. The touch sensing film is disposed on the lower surface of the display module and bends and extends along the side surface to the upper surface. The touch sensing film comprises a plurality of electrode lines disposed on one side of the touch sensing film. The plurality of transmission lines cover an end of the electrode lines located at the upper surface of the display module. The first adhesive layer is disposed on one side of the touch sensing film adjacent to the display module.

In some embodiments, the electrode lines adjacent to the side surface and the upper surface have a line width of more than 0.4 mm between each other.

In some embodiments, the transmission lines extend along the touch sensing film adjacent to a junction of the lower surface and the side surface and cover the electrode lines.

In some embodiments, the electrode lines adjacent to the side surface and the upper surface have a line width of less than 0.4 mm between each other.

In some embodiments, the foldable touch display device further comprises a protective layer disposed on an outer side of the transmission lines which cover the electrode lines so that the transmission lines are between the electrode lines and the protective layer.

In some embodiments, the display module further comprises an electronic paper module and a light guide panel disposed under the electronic paper module, wherein the first adhesive layer is between the light guide panel and the touch sensing film.

In some embodiments, the foldable touch display device further comprises a second adhesive layer disposed between the electronic paper module and the light guide panel.

In some embodiments, the foldable touch display device further comprises a third adhesive layer disposed under the touch sensing film relative to the lower surface of the display module and extending along the touch sensing film and bending along the side surface of the display module to the upper surface.

In some embodiments, the foldable touch display device further comprises a cover plate disposed under the touch sensing film relative to the lower surface of the display module.

In some embodiments, a material of the electrode lines comprises nano silver paste, nano silver mixture, nano silver polymer, or a combination thereof.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides a detailed description of many different embodiments, or examples, for implementing different features of the provided subject matter. These are, of course, merely examples and are not intended to limit the invention but to illustrate it. In addition, various embodiments disclosed below may combine or substitute one embodiment with another, and may have additional embodiments in addition to those described below in a beneficial way without further description or explanation. In the following description, many specific details are set forth to provide a more thorough understanding of the present disclosure. It will be apparent, however, to those skilled in the art, that the present disclosure may be practiced without these specific details.

Further, spatially relative terms, such as "beneath," "over" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

A number of examples are provided herein to elaborate on the foldable touch display device of the instant disclosure. However, the examples are for demonstration purpose alone, and the instant disclosure is not limited thereto.

Example 1

Figure 1:
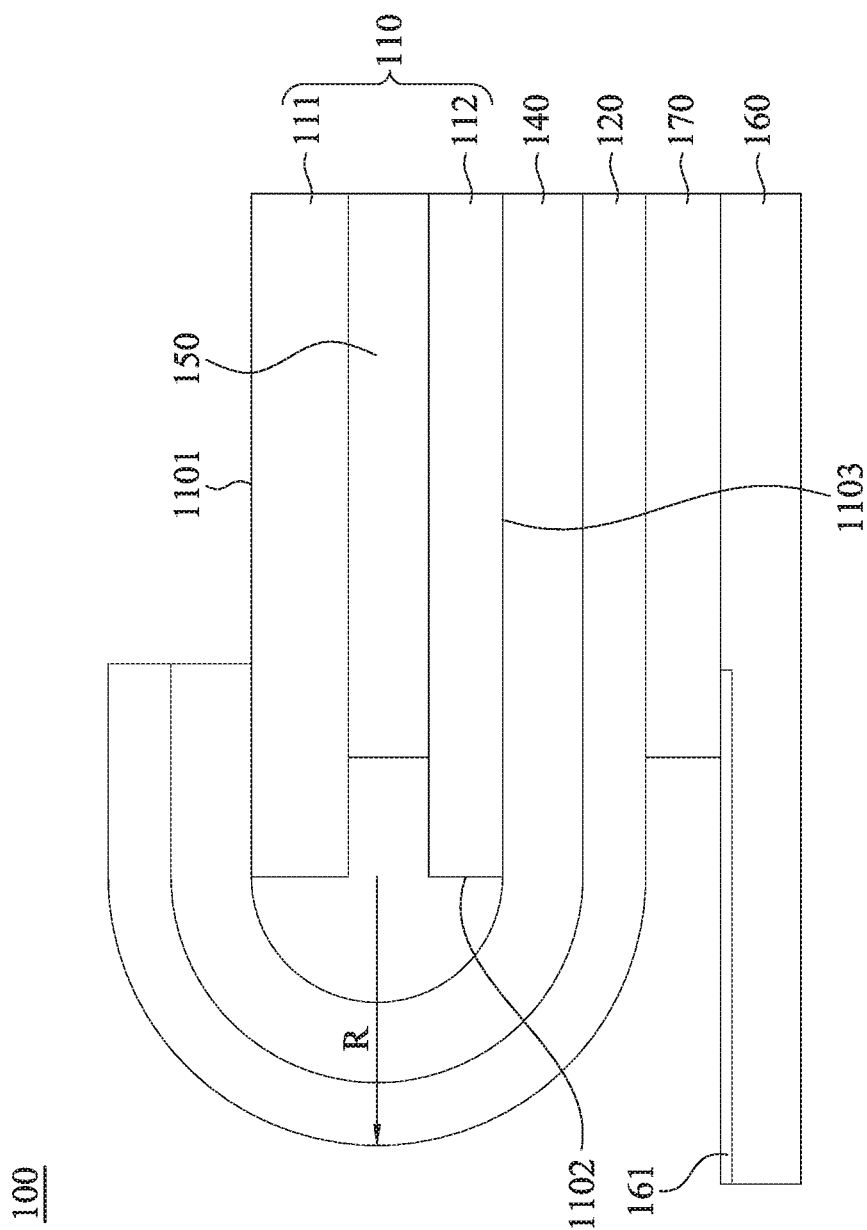
FIG. 1 is a cross-sectional view of the foldable touch display device according to a first example of the present disclosure.
Figure 2:
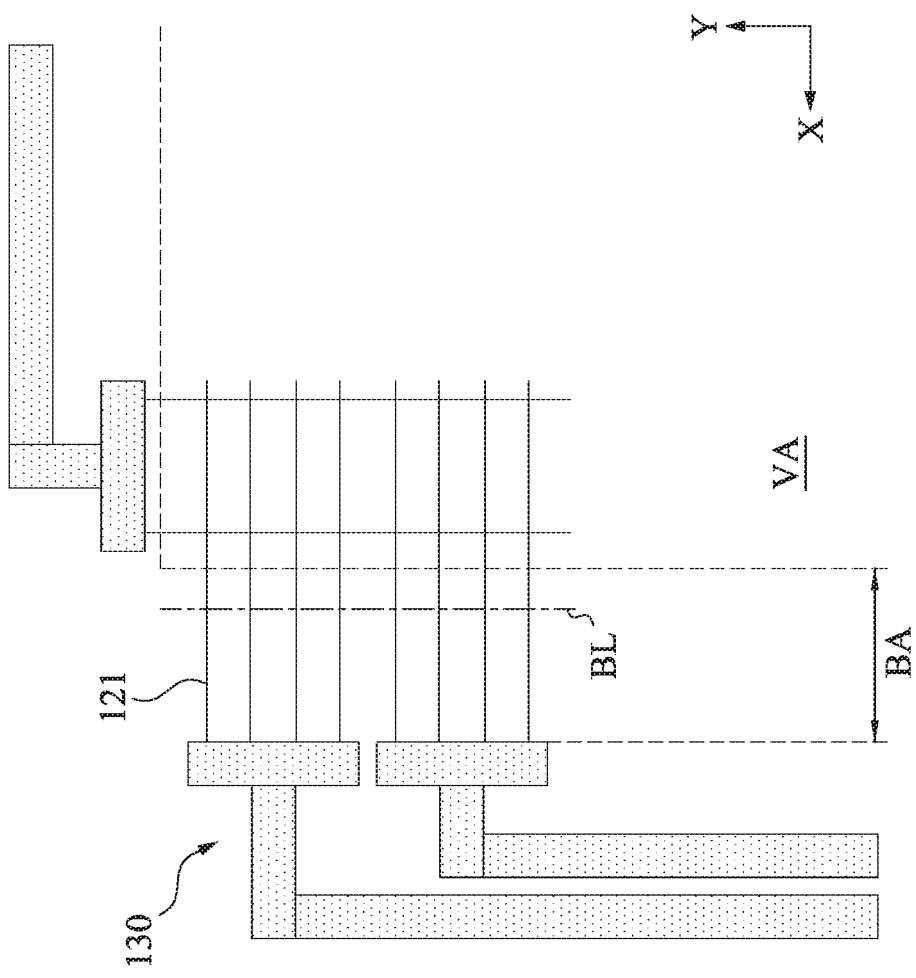
FIG. 2 depicts a schematic view of the electrode lines and the transmission lines according to the first example of the present disclosure.

FIG. 1 depicts a cross-sectional view of the foldable touch display device 100 according to a first example of the present disclosure, and FIG. 2 depicts a schematic view of the electrode lines 121 and the transmission lines 130 according to the first example of the present disclosure. The foldable touch display device 100 includes a display module 110, a touch sensing film 120, a plurality of transmission lines 130, a first adhesive layer 140, a second adhesive layer 150, a cover plate 160, and a third adhesive layer 170.

The display module 110 has an upper surface 1101, a side surface 1102, and a lower surface 1103. Regarding the aspect of the display module 110, a skilled person in the art can choose a suitable display module. In one example, the display module 110 includes an electronic paper module 111 and a light guide panel 112, and the light guide panel 112 is disposed under the electronic paper module 111 (such as electronic paper display). In another example, the display module 110 can be altered to include a backlight module, such as organic light-emitting Diode (OLED). The touch sensing film 120 is disposed on the lower surface 1103 of the display module 110, and bends and extends through the side surface 1102 to the upper surface 1101. Specifically, the touch sensing film 120 is disposed on the lower surface 1103 of the display module 110 and extends through the side surface 1102 to a portion of the upper surface 1101 adjacent to the side surface 1102, such that the touch sensing film 120 bends at the side surface 1102 and extends to the upper surface 1101.

The touch sensing film 120 includes a plurality of electrode lines 121 disposed on one side of the touch sensing film 120. In one example, the electrode lines 121 are disposed on a side of the touch sensing film 120 relative to the display module 110, that is, an outer side of the touch sensing film 120. In one example, the electrode lines 121 are made of transparent conductive material, and the electrode lines 121 can be obtained through etching. Under this circumstance, the transparent conductive material includes, but is not limited to, nano silver paste, nano silver mixture, nano silver polymer, or a combination thereof. In one example, the material of the electrode lines 121 is nano silver. Since the nano silver is flexible, the nano silver of this example can extend from a visible area VA and bends at a bending area BA from a bending line BL to the upper surface 1101, so that the radius of curvature of the bending area BA can be less than 1 mm, and the whole thickness can be reduced.

In some examples, the touch sensing film 120 includes first electrode lines in an X-axis direction and second electrode lines in a Y-axis direction. The first electrode lines and the second electrode lines are separately disposed on the two relative sides of the touch sensing film 120. The first electrode lines extend from the visible area VA toward the X-axis direction and bend at the bending area BA to the upper surface 1101. The second electrode lines extend from the visible area VA toward the Y-axis direction and bend at the bending area BA to the upper surface 1101. The first electrode lines and the second electrode lines of this example are not limited to bending and extending toward the left side in the X-axis direction and the upper side in the Y-axis direction; the first electrode lines and the second electrode lines also can bend and extend toward the right side in the X-axis direction and/or the lower side in the Y-axis direction.

The transmission lines 130 cover an end of the electrode lines 121 located at the upper surface 1101 of the display module 110. Regarding the aspect of the display module 110, a skilled person in the art can choose a proper number of the electrode lines 121 as a set to electrically connect to one of the transmission lines 130. In some examples, a set of the electrode lines 121 includes two electrode lines 121 electrically connected to one of the transmission lines 130 (as shown in FIG. 2). FIG. 2 is just a schematic view of multiple electrode lines, the specific number depends on the product size and design. The material of the transmission lines 130 includes, but is not limited to, indium tin oxide, silver, zinc, copper, gold, platinum, tungsten, aluminum, or metal alloys thereof. In some examples, the transmission lines 130 are a part of the flexible circuit board.

The first adhesive layer 140 is disposed on a side of the touch sensing film 120 adjacent to the display module 110. Specifically, the touch sensing film 120 and the first adhesive layer 140 are disposed on the lower surface 1103 of the display module 110 and extend along the side surface 1102 and the portion of the upper surface 1101 adjacent to the side surface 1102. Thus, the touch sensing film 120 and the first adhesive layer 140 are bent at the side surface 1102 and extend to the lower surface 1103. In some examples, the first adhesive layer 140 is optical clear adhesive (OCA), biaxially-oriented polyethylene terephthalate (BoPET, or Mylar®) or polyethylene terephthalate (PET) having OCA, which has a penetration rate for visible light (having a wavelength ranging from about 400 nm to about 700 nm) of more than 60% or even more than 80%.

The second adhesive layer 150 is disposed between the electronic paper module 111 and the light guide panel 112. In some examples, the second adhesive layer 150 is OCA, BoPET, or PET having OCA, which has a penetration rate for visible light of more than 60% or even more than 80%.

The cover plate 160 is disposed under the touch sensing film 120 relative to the lower surface 1103 of the display module 110. In one example, the cover plate 160 can be a transparent inorganic substrate, for example, a glass substrate, or a transparent organic substrate, such as a plastic substrate, for example, PET, polycarbonate (PC), polyethylene (PE), or polymethylmethacrylate (PMMA), etc. In one example, an opaque layer 161 is disposed beneath the cover plate 160 relative to the side surface 1102 of the display module 110. The opaque layer 161 can be composed of an opaque ink, such as black ink, white ink, etc. For example, the penetration rate of the opaque layer 161 to visible light is less than 20%.

The third adhesive layer 170 is disposed between the cover plate 160 and the touch sensing film 120. In some examples, the third adhesive layer 170 is PET having OCA, which has a penetration rate for visible light of more than 60% or even more than 80%.

Example 2

Figure 3:
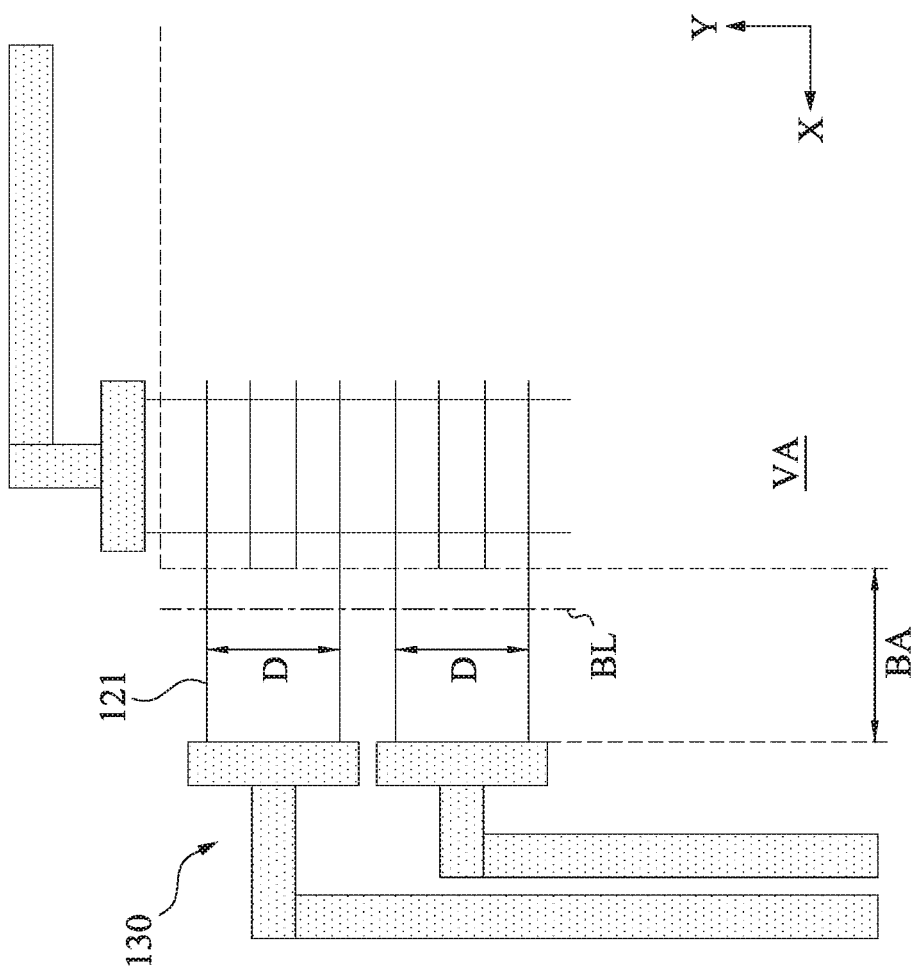
FIG. 3 depicts a schematic view of the electrode lines and the transmission lines according to a second example of the present disclosure.

FIG. 3 depicts a schematic view of the electrode lines 121 and the transmission lines 130 according to a second example of the present disclosure. Please refer to FIGS. 1 and 3. The difference between example 2 and example 1 is that the electrode lines 121 adjacent to the side surface 1102 and the upper surface 1101 of the display module 110 have a line width D of more than 0.4 mm between each other. For example, the line width D may be from 0.4 mm to 100 mm. In some examples, the line width D is 0.5 mm, 0.6 mm, 0.7 mm, 0.8 mm, 0.9 mm, 1.0 mm, 1.5 mm, 2.0 mm, 2.6 mm, 5.0 mm, 10 mm, 50 mm, 100 mm, or any value between any two of these values. In some examples, a set of the electrode lines 121 include four adjacent electrode lines 121. When the four adjacent electrode lines 121 are located at a junction of the side surface 1102 and the lower surface 1103, the two most inner electrode lines 121 are connected to each other, so that when the two most outer electrode lines 121 are located at a junction of the side surface 1102 and the upper surface 1101, the line width D is more than 0.4 mm, such as between 0.4 mm and 100 mm. In some examples, the line width D is 0.5 mm, 0.6 mm, 0.7 mm, 0.8 mm, 0.9 mm, 1.0 mm, 1.5 mm, 2.0 mm, 2.6 mm, 5.0 mm, 10 mm, 50 mm, 100 mm, or any value between any two of these values. Therefore, in this example, the broader the electrode line 121 at the bending area BA, the faster the transmission signal will be because the radius of curvature R is less than 1 mm and the impedance is less than 100 ohm/square at the bending area BA.

Example 3

Figure 4:
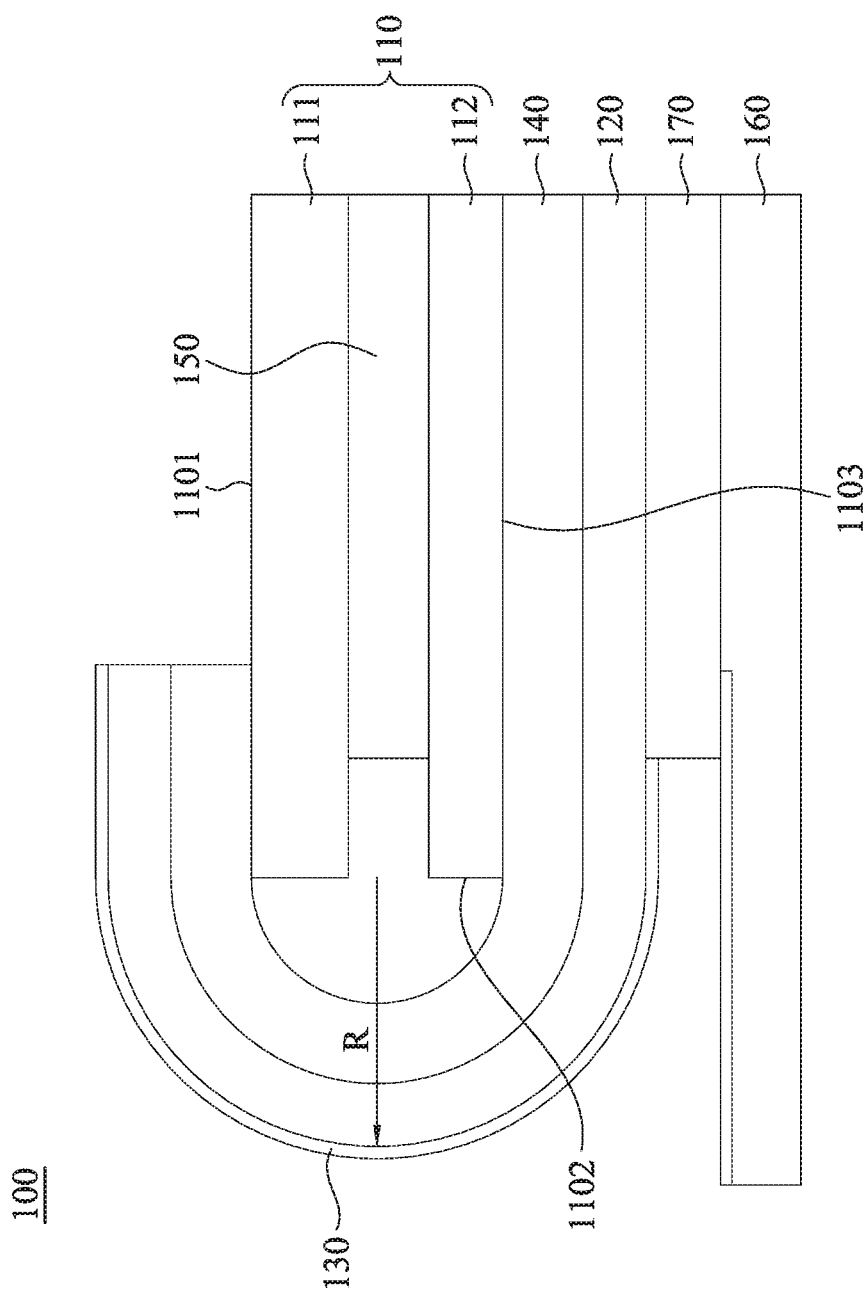
FIG. 4 depicts a cross-sectional view of the foldable touch display device according to a third example of the present disclosure.
Figure 5:
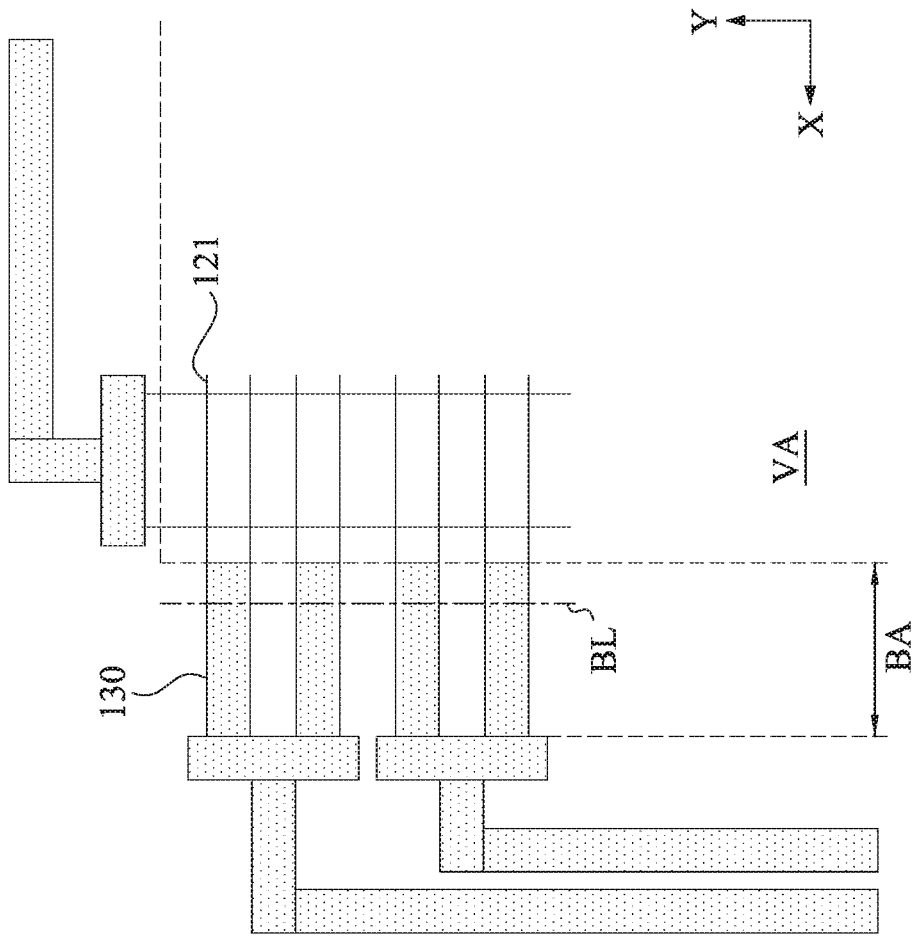
FIG. 5 depicts a schematic view of the electrode lines and the transmission lines according to the third example of the present disclosure.

FIG. 4 depicts a cross-sectional view of the foldable touch display device 100 according to a third example of the present disclosure. FIG. 5 depicts a schematic view of the electrode lines 121 and the transmission lines 130 according to the third example of the present disclosure. The difference between example 3 and example 1 is that the transmission lines 130 extend along the touch sensing film 120 to the adjacent junction of the side surface 1102 and the lower surface 1103 of the display module 110 and cover the electrode lines 121. Specifically, the transmission lines 130 cover from an end of the electrode lines 121 located at the upper surface 1101 of the display module 110, extend along the touch sensing film 120 to the adjacent junction of the side surface 1102 and the lower surface 1103 of the display module 110, and cover the electrode lines 121. In one example, the transmission lines 130 are bonded with the electrode lines 121 by the OCA. The transmission lines 130 extend to the bending area BA without increasing the line width between the electrode lines 121 (for example, maintaining the line width at 0.2 mm), so that the impedance at the bending area BA is less than 10 ohm/square to achieve a smaller radius of curvature R (such as R<0.5 mm).

Example 4

Figure 6:
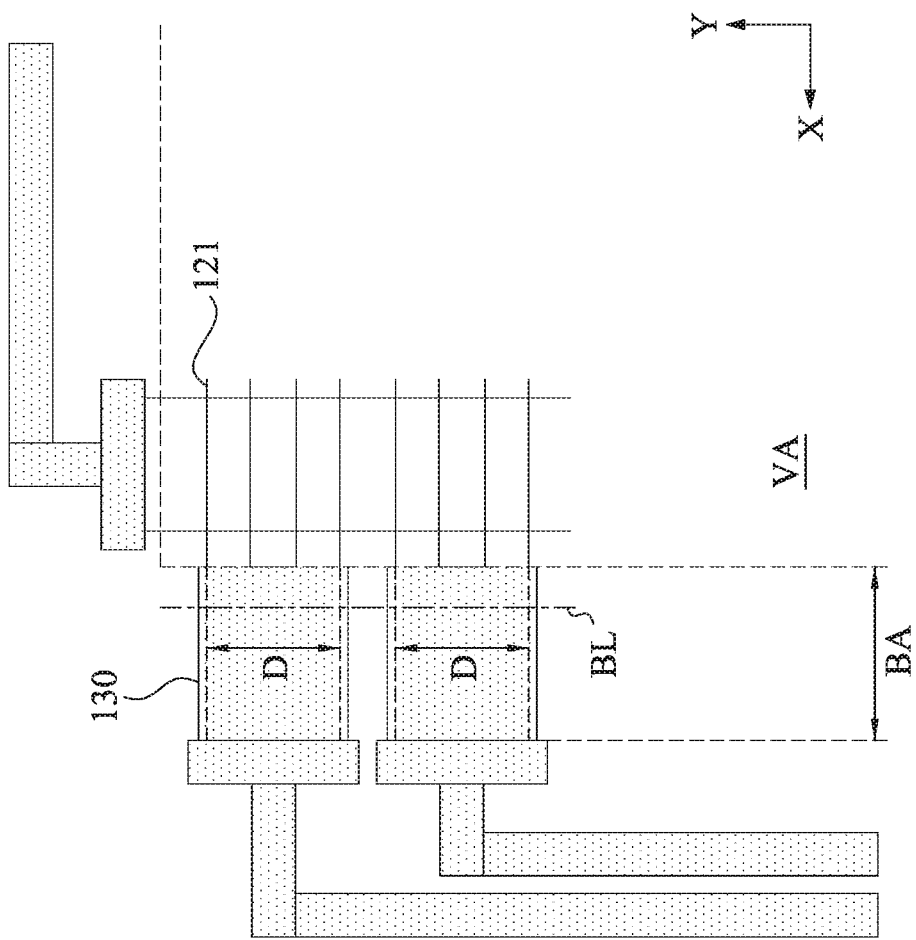
FIG. 6 depicts a schematic view of the electrode lines and the transmission lines according to a fourth example of the present disclosure.

FIG. 6 depicts a schematic view of the electrode lines 121 and the transmission lines 130 according to a fourth example of the present disclosure. Please refer to FIGS. 4 and 6. The difference between example 4 and example 2 is that the transmission lines 130 extend along the touch sensing film 120 to the adjacent junction of the side surface 1102 and the lower surface 1103 of the display module 110 and cover the electrode lines 121. Specifically, the transmission lines 130 cover from an end of the electrode lines 121 located at the upper surface 1101 of the display module 110, extend along the touch sensing film 120 to the adjacent junction of the side surface 1102 and the lower surface 1103 of the display module 110, and cover the electrode lines 121. The transmission lines 130 extend to the bending area BA while increasing the line width D between the electrode lines 121 (since this is the same as example 2, details are not described herein again), so that the impedance at the bending area BA is less than 10 ohm/square to achieve a smaller radius of curvature R (such as R<0.5 mm).

Example 5

Figure 7:
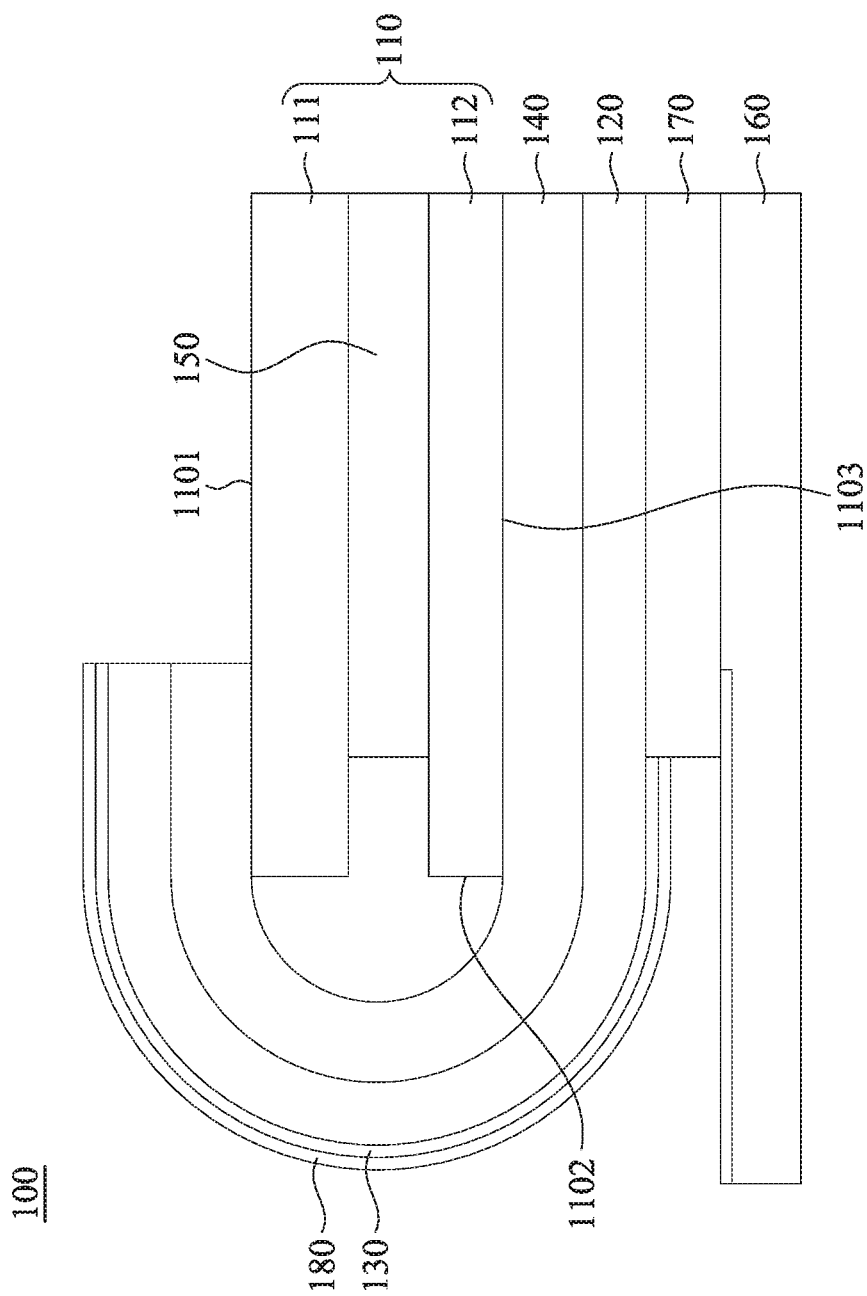
FIG. 7 depicts a cross-sectional view of the foldable touch display device according to a fifth example of the present disclosure.
Figure 8:
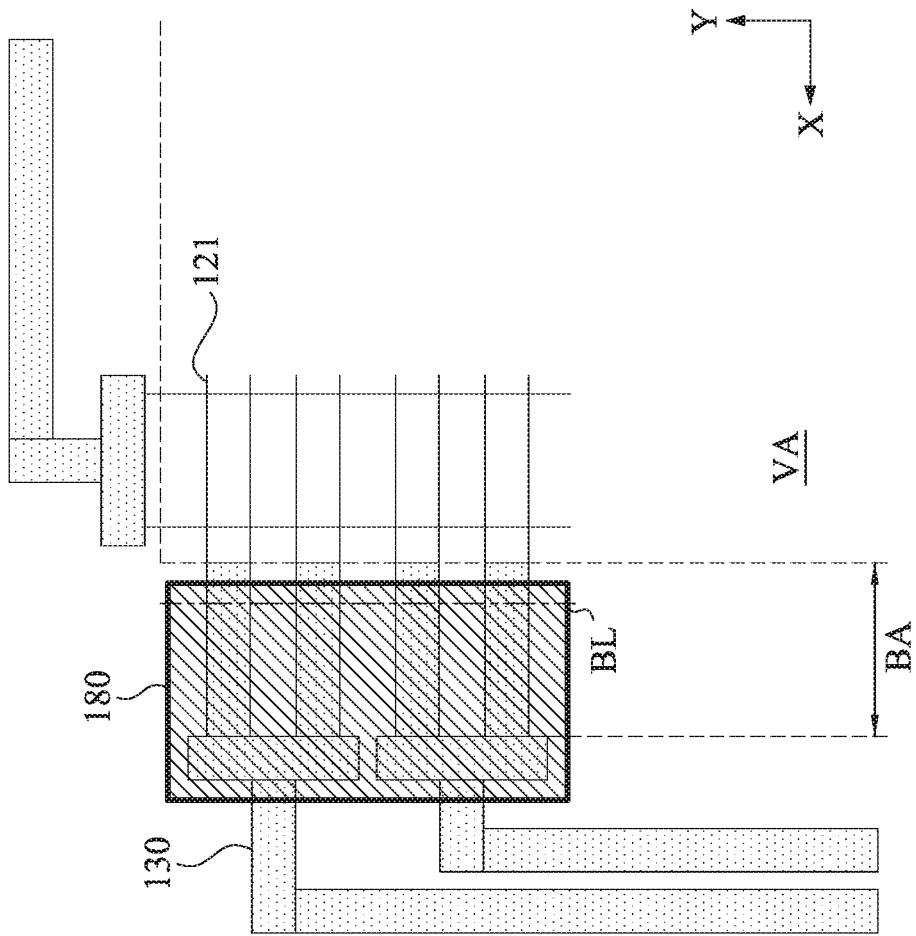
FIG. 8 depicts a schematic view of the electrode lines and the transmission lines according to the fifth example of the present disclosure.

FIG. 7 depicts a cross-sectional view of the foldable touch display device 100 according to a fifth example of the present disclosure. FIG. 8 depicts a schematic view of the electrode lines 121 and the transmission lines 130 according to the fifth example of the present disclosure. The differences between example 5 and examples 3-4 are that the foldable touch display device 100 further includes a protective layer 180. The protective layer 180 is disposed on the outside of the transmission lines 130 covering the electrode lines 121, so that the transmission lines 130 are between the electrode lines 121 and the protective layer 180. In one example, the protective layer 180 directly covers the touch sensing film 120 where there are no transmission lines 130. In some examples, the protective layer 180 has a thickness less than 30 mm, such as from 1 mm to 30 mm. In one example, the thickness of the protective layer 180 is 2 mm, 4 mm, 6 mm, 8 mm, 10 mm, 15 mm, 20 mm, 25 mm, or any value between any two of these values. In one embodiment, the material of the protective layer 180 includes, but is not limited to, epoxy, acrylic acid copolymer (also called PMMA), ethyl diethylene glycol acetate, or combinations thereof. Specifically, the protective layer 180 is protect ink.

Example 6

Figure 9:
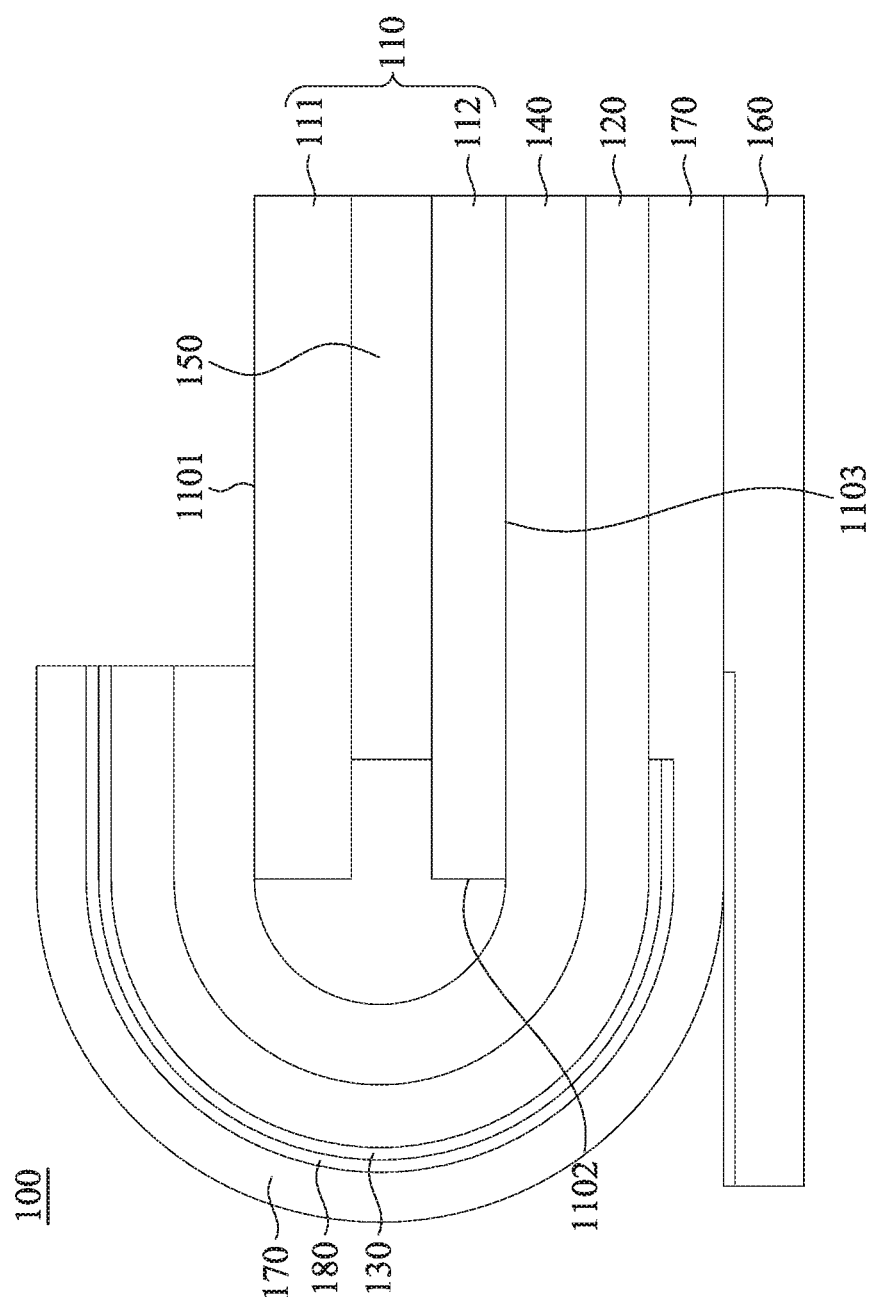
FIG. 9 depicts a cross-sectional view of the foldable touch display device according to a sixth example of the present disclosure.

FIG. 9 depicts a cross-sectional view of the foldable touch display device 100 according to a sixth example of the present disclosure. The differences between example 6 and example 5 is that the foldable touch display device 100 further includes a third adhesive layer 170 disposed between the cover plate 160 and the touch sensing film 120 and extending along the touch sensing film 120 and bending through the side surface 1102 of the display module 110 to the upper surface 1101. In some examples, the third adhesive layer 170 is OCA, which has a penetration rate for visible light of more than 60% or even more than 80%. In some examples, the third adhesive layer 170 has a thickness less than 100 μm, such as from 10 μm to 100 μm. In one example, the thickness of the third adhesive layer 170 is 20 μm, 40 μm, 60 μm, 80 μm, or any value between any two of these values.

In some embodiments of the present disclosure, first, the extending electrode lines as signal lines bending at the bending area improve the traditional excessive flexible circuit board circuit in the bending area, so that the thickness of the bezel is reduced. Second, the electrode lines having different line widths at the bending area reduce the impedance of the bending area to improve the speed of signal transmission. Third, the transmission lines extending and covering the electrode lines at the bending area reduce the impedance at the bending area, thus the electrode lines at the bending area can maintain the original line width without further extension and can even shorten the line width. The above technical features can achieve a smaller radius of curvature in the bending area and achieve a narrower side width of the screen, while avoiding electrical interference of the front transmission lines.

While the disclosure has been described by way of example(s) and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A foldable touch display device, comprising:
   a display module comprising an upper surface, a side surface, and a lower surface;
   a touch sensing film disposed on the lower surface of the display module and bending and extending along the side surface to the upper surface, the touch sensing film comprising:
      a plurality of electrode lines disposed on one side of the touch sensing film;
   a plurality of transmission lines covering an end of the electrode lines located at the upper surface of the display module; and
   a first adhesive layer disposed on one side of the touch sensing film adjacent to the display module.

2. The foldable touch display device of claim 1, wherein the electrode lines adjacent to the side surface and the upper surface have a line width of more than 0.4 mm between each other.

3. The foldable touch display device of claim 1, wherein the transmission lines extend along the touch sensing film adjacent to a junction of the lower surface and the side surface and cover the electrode lines.

4. The foldable touch display device of claim 3, wherein the electrode lines adjacent to the side surface and the upper surface have a line width of less than 0.4 mm between each other.

5. The foldable touch display device of claim 3, further comprising a protective layer disposed on an outer side of the transmission lines which cover the electrode lines so that the transmission lines are between the electrode lines and the protective layer.

6. The foldable touch display device of claim 1, wherein the display module further comprises an electronic paper module and a light guide panel disposed under the electronic paper module, wherein the first adhesive layer is between the light guide panel and the touch sensing film.

7. The foldable touch display device of claim 6, further comprising a second adhesive layer disposed between the electronic paper module and the light guide panel.

8. The foldable touch display device of claim 1, further comprising a third adhesive layer disposed under the touch sensing film relative to the lower surface of the display module and extending along the touch sensing film and bending along the side surface of the display module to the upper surface.

9. The foldable touch display device of claim 1, further comprising a cover plate disposed under the touch sensing film relative to the lower surface of the display module.

10. The foldable touch display device of claim 1, wherein a material of the electrode lines comprises nano silver paste, nano silver mixture, nano silver polymer, or a combination thereof.

* * * * *